Patented June 30, 1936

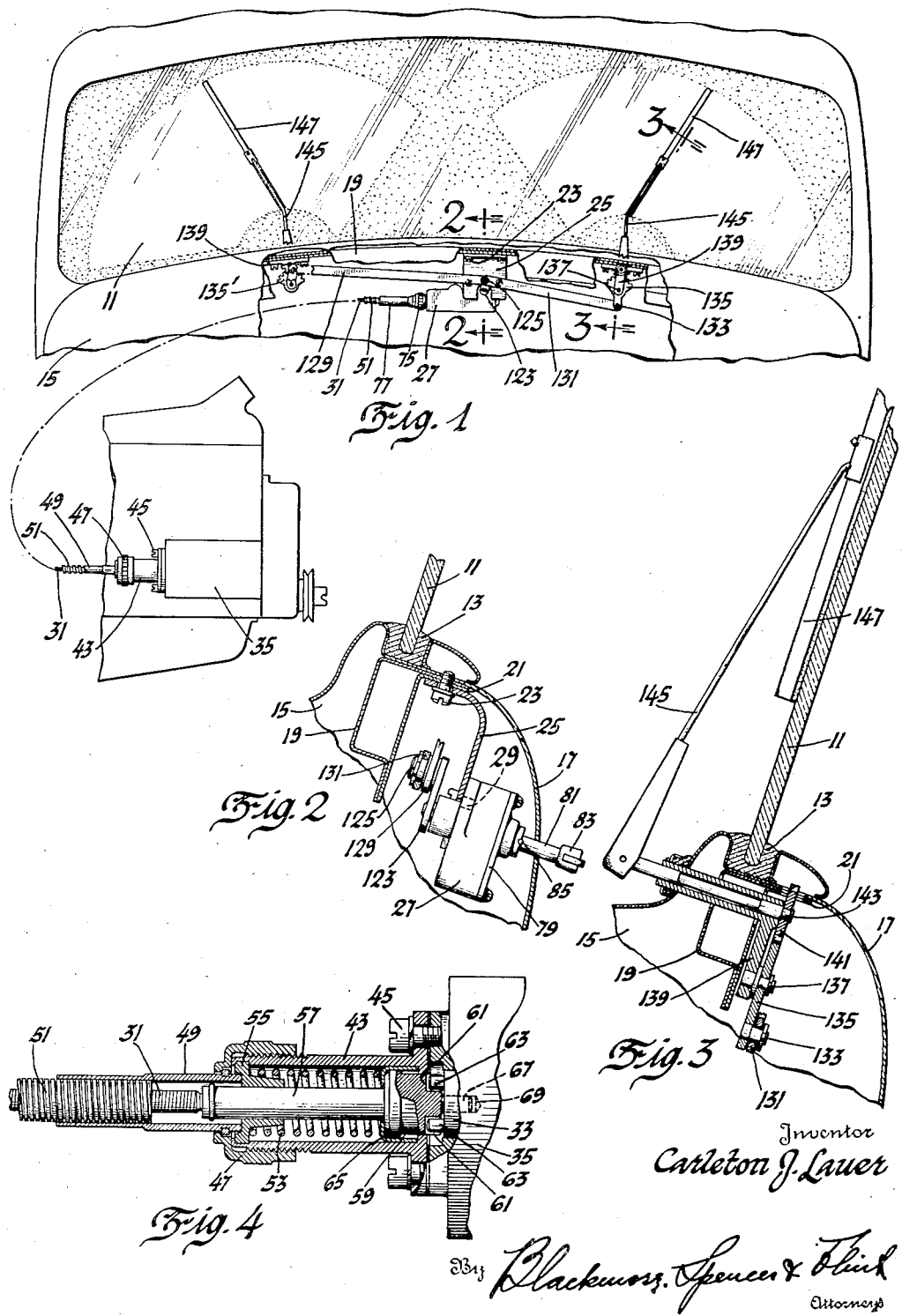

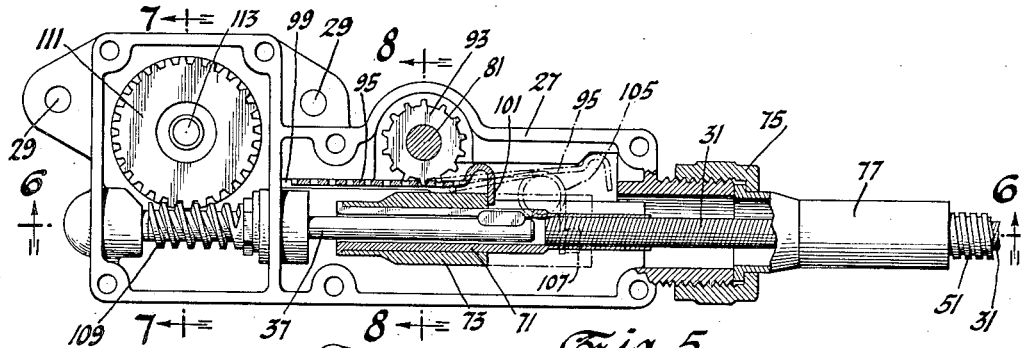
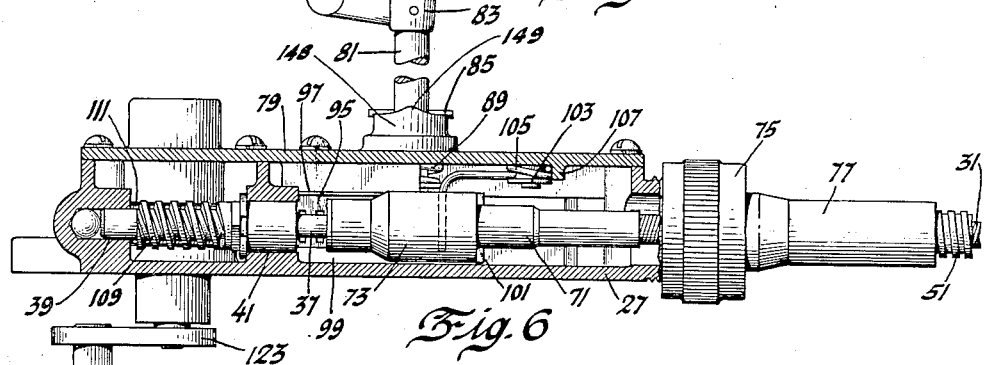
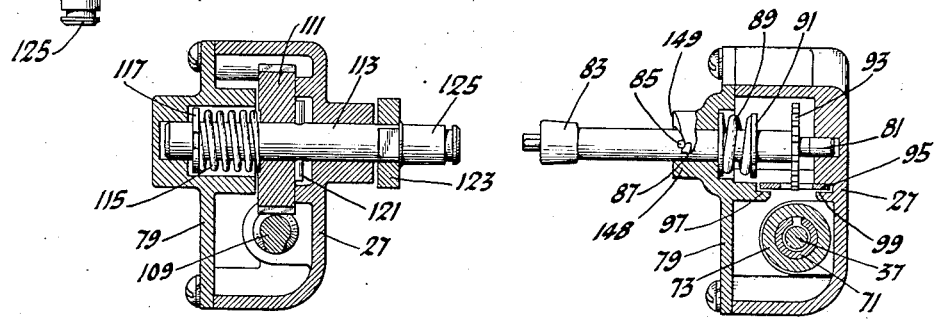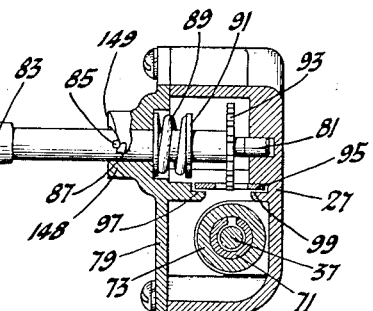
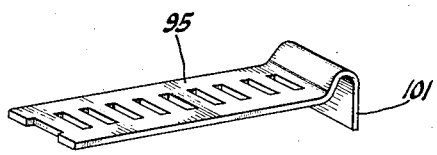

2,046,171

UNITED STATES PATENT OFFICE 2,046,171

CLUTCH OPERATOR FOR WINDSHIELD WIPERS

Carleton J. Lauer, Flint, Mich., assignor, by mesne assignments, to General Motors Corporation, Detroit, Mich., a corporation of Delaware Application August 4, 1933, Serial No. 683,591

5 Claims. (Cl. 192—32)

This invention relates to windshield cleaners of the mechanically operated type.

An object of the invention is to provide a simple mechanically operated cleaner in which manually operated means is employed to release the operative connection with the driving source.

Another object is to provide economy in construction and efficiency in operation.

Other objects and advantages will be understood from the following description.

In the drawings accompanying this description Fig. 1 is a view in elevation of a windshield with the cleaner installed, parts of the view being broken away to illustrate the operating mechanism.

Fig. 2 is a section on line 2—2 of Fig. 1.

Fig. 3 is a view on line 3—3 of Fig. 1.

Fig. 4 is a longitudinal section showing the driving connection between the operating cable and the power source.

Fig. 5 is an elevation showing the operating mechanism within the housing, parts being in section.

Fig. 6 is a section on line 6—6 of Fig. 5.

Fig. 7 is a section on line 7—7 of Fig. 5.

Fig. 8 is a section on line 8—8 of Fig. 5.

Fig. 9 is a view of a detail in perspective.

Referring by reference characters to the figures of the drawing, numeral 11 represents the windshield of a motor vehicle associated, as shown in Figs. 2 and 3, with a seat 13 between a cowl portion 15 and an instrument board 17. A hollow box-like member 19 extends transversely of the vehicle beneath the parts 15 and 17 and is located under the base portion 13. This box-like portion has rearwardly directed flanges 21 as shown in Figs. 2 and 3. Fastening means 23 near the mid portion of the windshield secure a bracket 25 to the flanges 21. A housing for the operating mechanism is represented by numeral 27. It is secured beneath the instrument board 17 and to the rear side of the downwardly directed part of the bracket 25 as shown in Fig. 2. In Fig. 5 numeral 29 represents openings for the attaching means by which the housing is secured to the bracket 25.

A flexible cable 31 transmits the rotary movement of a driving part of some engine accessory, for example shaft 33 of generator 35, to a shaft 37 rotatably supported as at 39 and 41 within the housing 27. This cable is axially movable and is intended to be clutched and declutched by such axial movements from the generator shaft. The arrangement for clutching and declutching is shown in Fig. 4. A sleeve 43 is secured by fastening means 45 to the end wall of the generator. A cap 47 is threaded to the sleeve 43. This cap positions a terminal element 49 relative to the sleeve. To the terminal element 49 is secured a flexible housing 51 surrounding the operating cable 31. Within the sleeve 43 is a spring 53 engaging at one end an abutment 55 seated against the end of the sleeve. The cable 31 carries an extension 57 having attached thereto or integral therewith a head 59, the latter and the generator shaft 33 having cooperating clutch elements 61 and 63. The spring 53 functions normally to effect the engagement of the clutch as will be understood. Preferably a cup-shaped guide 65 encompasses the head 59 and guides its movements within the sleeve 43 and serves to take the spring load when the clutch is engaged and, therefore, whenever the clutch driven shaft is operating, thus eliminating the thrust of the spring from the moving part. The head 59 may also be provided with an axial pin 67 piloted into an opening 69 in the driving portion of the clutch. To release the clutch as suggested above, the flexible cable 31 is pulled through the housing 51 and with it the parts 57 and 59, whereupon the clutch elements associated with the head 59 and shaft 33 become disengaged.

Within the housing 27 is a shaft 37 as stated above. Slidably splined on shaft 37 is a sleeve 71 to one end of which is secured the end of the cable 31. Surrounding and secured to the sleeve 71 is a collar 73. A cap 75 is threaded on the end of the housing 27 and secures thereto a terminal member 77 which is attached to the flexible cable housing 51.

Cooperating with housing 27 and covering the open side thereof is a cover 79. Journaled in the housing and cover in the vicinity of the collar 73 is a shaft 81. Externally of the housing the shaft 81 has a crank arm 83. Shaft 81 carries a diametrically positioned pin 85 for entry into a notch 87 on the cover boss 108 for the purpose of preventing undesired rotation of the shaft. To hold the pin in the notch is a spring 89 surrounding the shaft and acting against the cover as one abutment and against a second abutment 91 carried by the shaft. The shaft carries a pinion 93, the teeth of which engage the teeth of a rack 95 having sliding support as at 97 and 99 in the cover and casing. The rack has a hooked end 101 engageable with the end of the collar 73 and operable when shaft 81 is rotated in one direction to pull the cable and release the clutch at its remote end, this cable release being against the tension of spring 53. When so released a slight axial movement of shaft 81 under the influence of spring 89 causes it to be held by engagement of the pin 85 in the recess of cover boss 148. This boss has a ramp 149 in the form of a helix over which pin 85 travels; said ramp coacting with spring 89 assists the handle to turn off or on, depending on which side of the apex of the ramp the cross pin 85 is.

A stud 103 projects from the cover 79 and supports a torsion spring 105. One end of this spring engages a lug 107 within the cover. The other end engages underneath the rack 95 as shown by Fig. 5. When the rack is reciprocated from the full line position to the dotted line position the spring lifts the hooked end of the rack out of engagement with the collar 73. This occurs when, under the action of spring 53, the clutch between parts 59 and 33 engages to effect a rotation of the shaft 37, in obedience to partial rotation of handle shaft 81.

Near the end of shaft 37 is a worm 109 operable, when shaft 37 rotates, to rotate worm gear 111 on shaft 113 journaled in the housing and cover as shown by Fig. 7. The worm gear may be held non-rotatably on its shaft by a shaft encompassing spring 115 engaging a shaft carrying abutment 117, the spring also engaging the gear and operable to lock a shaft carried element 121 thereto in a well-known manner. Shaft 113 carries a radial crank 123 provided with a crank pin 125. From the crank pin 125 there extend oppositely directed links 129 and 131.

Link 131 at its end remote from its connection with crank pin 125 engages a pin 133 on an arm of a segmental gear 135 pivoted at 137 by a bracket 139. The bracket is suitably secured to the housing flanges 21. The teeth of the segmental gear 135 engage the teeth of a pinion 141 carried on a shaft 143 rotatable within a hollow shaft, the latter preferably formed integral with the bracket 139. The shaft 143 extends from a position within the members 15 and 17 to a position outside the cowl member 15 and in front of and below the windshield. It carries pivotally a cleaner arm 145, the latter equipped with a cleaner blade 147 as usual. The link 129 is extended in an opposite direction as stated and is pivoted to an arm associated with a second segmental gear 135'. For the purpose of providing opposite directions of rotation to the two blades the arm of gear 135' to which the link 129 is connected extends upwardly from the pivoted gear instead of downwardly as in the case of link 131.

It will be understood that rotation of shaft 81 by means of its handle or arm 83 will pull the rack from the dotted line position to the full line position of Fig. 5, thereby pulling the cable and releasing the driving clutch. Preferably the clutch disconnection will be made when the blades are at the limits of its movement away from each other. At this time a slight axial movement of the shaft by its spring 89 locks the shaft from rotation through the instrumentality of the pin 85, the spring 53 being held under tension. To reengage the clutch to effect operation of the cleaner a slight opposite axial movement of shaft 83 against the tension of spring 89 permits shaft rotation in a direction such as to render spring 53 effective to cause clutch engagement simultaneously with the movement of the cable. The torsion spring lifts the hooked end of the rack away from part 73. This has the great advantage of keeping the hooked portion 101 of the rack 95 out of engagement with any revolving parts while the wiper is in operation; thus avoiding any wear, noise, etc. The only brief moment, during which the hook portion of the rack touches the revolving part 73 and shaft assembly, happens when the rack is pulled backward to disengage the flexible shaft from the driving means for stopping the wiper.

This parking of the rack hooked portion out of the way also makes possible the easy assembly of the shaft, sleeve and collar assembly into the wiper head.

If it be desired to manually rotate the blades the connection at 121 effected by the spring 115 permits, by the yielding of the spring, such action to take place without rotation of the driving gear elements 109, 111.

I claim:

1. In windshield cleaner mechanism, a housing, a rotary shaft therein, an axially movable cable extending into said housing and having a slidable but non-rotatable connection relative to said shaft, means in said housing movable in one direction to engage and axially move said cable, additional means in said housing to move said movable means from engagement with said cable when said cable is moved in the opposite direction whereby to facilitate assembly of the cable.

2. In windshield cleaner mechanism, a shaft mounted to rotate and to reciprocate, one end of said shaft having means to drivingly engage a power source whereby, when reciprocated to engage said source, the shaft may be rotated, yielding means to bias said shaft to driving engagement with said power source, mechanism whereby the other end of said shaft is adapted to operate cleaner mechanism, a slidable rack adapted to move said shaft bodily and declutch it from the power source, said rack being out of engagement with said shaft when the shaft is reciprocated to its position of driving engagement with the power source, manually operable means including a pinion engaging said rack to slide the rack and to engage and move said shaft and disconnect it from its driving source.

3. In windshield cleaner mechanism, a first shaft adapted to rotate and operate a windshield cleaner, a second shaft mounted to rotate and reciprocate and having a slidable but non-rotatable relation with the first shaft, one end of the second shaft adapted to be clutched to a source of power whereby when reciprocated to engage said source it may itself rotate and thereby rotate the first shaft, first yielding means to reciprocate said second shaft to driving position, a slidable rack movable to engage and move said second shaft from clutch engagement with said power source, second yielding means engageable with and operable upon said rack to move it from engagement with said second shaft when the latter is in clutch engaging position, and manually operable means including a pinion operable to slide said rack and shift said second shaft into declutching position against the tension of said first yielding means.

4. The invention defined by claim 3, said second shaft having a collar fixed thereto and said rack having an offset to engage said collar.

5. The invention defined by claim 3, said second shaft having a collar fixed thereto, said rack having an offset to engage said collar, and said second yielding means operable to move said offset from said collar in the clutch engaging position of the second shaft.

CARLETON J. LAUER.